United States Patent
Sieker (10) Patent No.: US 9,834,191 B2
(45) Date of Patent: Dec. 5, 2017

(54) RELAY VALVE, VALVE DEVICE, AND VEHICLE THEREWITH

(71) Applicant: WABCO GmbH, Hannover (DE)

(72) Inventor: Armin Sieker, Bielefeld (DE)

(73) Assignee: WABCO GmbH, Hannover (DE)

( * ) Notice: Subject to any disclaimer, the term of this patent is extended or adjusted under 35 U.S.C. 154(b) by 3 days.

(21) Appl. No.: 15/026,080

(22) PCT Filed: Sep. 26, 2014

(86) PCT No.: PCT/EP2014/002621
§ 371 (c)(1),
(2) Date: Mar. 30, 2016

(87) PCT Pub. No.: WO2015/058829
PCT Pub. Date: Apr. 30, 2015

(65) Prior Publication Data
US 2016/0236666 A1 Aug. 18, 2016

(30) Foreign Application Priority Data

Oct. 26, 2013 (DE) .................. 10 2013 017 876

(51) Int. Cl.
*B60G 17/052* (2006.01)
*B60T 15/18* (2006.01)
(52) U.S. Cl.
CPC .................. *B60T 15/18* (2013.01)
(58) Field of Classification Search
CPC ..................................... B60T 15/18
(Continued)

(56) References Cited

U.S. PATENT DOCUMENTS

| 467,060 A | * | 1/1892 | Soulerin | ............... B60T 15/18 303/28 |
| 2,493,449 A | * | 1/1950 | Fitch | ...................... B60T 15/18 137/85 |

(Continued)

FOREIGN PATENT DOCUMENTS

| DE | 3435551 A1 | 4/1985 |
| DE | 19855217 A1 | 6/1999 |

(Continued)

OTHER PUBLICATIONS

European Patent Office, Rijswijk, Netherlands, International Search Report of International Application No. PCT/EP2014/002621, dated Apr. 14, 2015, 3 pages.

*Primary Examiner* — Umashankar Venkatesan
(74) *Attorney, Agent, or Firm* — Brinks Gilson & Lione (57) ABSTRACT

A relay valve (2) for a compressed air system, has a housing, which has a pressure medium inlet that can be connected to a pressure medium source, at least one pressure medium outlet that can be connected to a consuming unit, at least one control inlet, and at least one vent (32) leading to atmosphere. The relay valve (2) furthermore has a relay valve piston (14), which is arranged in the housing in such a way that the relay valve piston can be moved along a relay valve piston axis (16) and divides a control chamber (22) and a working chamber (26) from each other in the housing. The relay valve (2) has a damping volume (52), which is pneumatically connected to the control chamber (22), thereby advantageously enabling the oscillation capacity of the relay valve piston (14) to be reduced.

9 Claims, 8 Drawing Sheets (58) Field of Classification Search
USPC .................................................. 137/627.5
See application file for complete search history.

(56) References Cited

U.S. PATENT DOCUMENTS

| | | | | |
|---|---|---|---|---|
| 3,022,118 | A | * | 2/1962 | Dobrikin ................. B60T 15/18 137/102 |
| 3,730,226 | A | | 5/1973 | Nelson |
| 6,662,561 | B1 | * | 12/2003 | Doty ....................... B60T 15/36 60/547.1 |
| 2013/0020514 | A1 | | 1/2013 | Watanabe et al. |

FOREIGN PATENT DOCUMENTS

| | | |
|---|---|---|
| DE | 10238182 A1 | 3/2004 |
| DE | 10245916 A1 | 4/2004 |
| EP | 1844999 A1 | 10/2007 |
| GB | 1428438 A | 3/1976 |

* cited by examiner (PRIOR ART)

RELAY VALVE, VALVE DEVICE, AND VEHICLE THEREWITH

TECHNICAL FIELD

The invention relates to a relay valve for a compressed air system, to a valve device having the relay valve, and to a vehicle having the relay valve and/or having the valve device.

BACKGROUND OF THE INVENTION

A relay valve according to the prior art accelerates the admission and release of air, e.g. to and from the brake cylinders. It acts as a valve which boosts the volume of air inasmuch as the relay valve controls relatively large volumes of compressed air, e.g. for the brake cylinders of an air braking system of a vehicle, with relatively small volumes of air.

In conventional arrangements, the relay valve has a housing, which has a pressure medium inlet that can be connected to a pressure medium source, at least one pressure medium outlet that can be connected to a consuming unit, at least one control inlet, and at least one vent leading to atmosphere. The relay valve furthermore has a relay valve piston, which is arranged in the housing in such a way that the relay valve piston can be moved along a relay valve piston axis and divides a control chamber and a working chamber from each other in the housing.

On one side, the relay valve piston can thus be subjected via the control chamber to control pressure and, on the other side, it can be subjected via the pressure medium outlet to a working pressure provided by a consuming unit.

An inlet valve is arranged between the working chamber and an air admission chamber that can be connected via the pressure medium inlet to the pressure medium source, and an outlet valve is arranged between the working chamber and a venting chamber leading to atmosphere.

When the control chamber is supplied with a pressure medium, the relay valve piston moves into the working chamber in accordance with the control pressure of the pressure medium. In the course of this movement, the relay valve piston first of all closes the outlet valve and then opens the inlet valve counter to the force of a spring. By virtue of the connection established between the air admission chamber and the working chamber, a pressure builds up in the working chamber, counteracting the control pressure on the relay valve piston.

When there is substantially an equilibrium between the forces caused by the pressures on the relay valve piston, the relay valve piston is pushed back counter to its original movement. During this process, the inlet valve is closed, without however opening the outlet valve, with the result that the pressure in the working chamber and in the consuming units connected via the pressure medium outlet is maintained.

If the control chamber is partially or completely vented, the relay valve piston moves further, counter to its original direction of movement, and the outlet valve opens. The pressure in the working chamber then falls to a value at which there is once again an equilibrium of forces on the relay valve piston and the outlet valve is closed again. If the control chamber is completely vented, the working chamber is also completely vented, leading to venting of the downstream consuming units. A relay valve operating in this way is known from EP 1 844 999 A1, for example.

Conventional relay valves of this kind are generally integrated into a valve device together with further components, in particular a valve device having a pilot control unit and at least one relay valve. Such valve devices are used in pneumatic systems, such as braking systems or air suspension systems for commercial vehicles.

However, supplying the control chamber of the relay valve with a pressure medium can lead to oscillations of the relay valve piston since the relay valve piston, together with the control chamber volume, which acts as an air spring, represents an oscillatory system. Such oscillations arise preferentially in the case of cyclical excitation of the relay valve and can lead to destruction of the relay valve.

A possible embodiment of the relay valve to avoid oscillations of the relay valve piston is shown in DE 102 38 182 A1. A sealed partition wall arranged in the working chamber has a device for pressure compensation. Here, the partition wall has the function of a baffle and shields the relay valve piston from the dynamic gas flow forces. However, unwanted pronounced pressure peaks can arise in this arrangement, depending on the size of the consuming units connected.

SUMMARY OF THE INVENTION

It is therefore the underlying problem of the invention to improve a relay valve and a valve device and, in particular, to reliably reduce the oscillations of the relay valve piston.

The invention solves this problem by means of a relay valve, a valve arrangement, and a vehicle having such a relay valve.

The relay valve according to the invention is suitable for a compressed air system and has a housing, which has a pressure medium inlet, which can be connected to a pressure medium source, at least one control inlet, and at least one vent leading to atmosphere.

The relay valve furthermore has a relay valve piston, which is arranged in the housing in such a way that the relay valve piston can be moved along a relay valve piston axis and divides a control chamber and a working chamber from each other in the housing.

The relay valve according to the invention is characterized by a damping volume, which is pneumatically connected to the control chamber.

Conventional relay valves, in particular cyclically controlled relay valves, tend to exhibit pronounced self-oscillation in certain operating states, on the one hand causing noise and on the other hand leading potentially to destruction of the relay valve. The additional damping volume in the control part of the relay valve advantageously reduces the oscillation capacity of the relay valve piston and thus leads to avoidance of the disadvantageous self-oscillation of the relay valve.

In a preferred embodiment of the invention, the damping volume is integrated into or arranged in the housing, in particular into a housing cover of the housing. It is thereby advantageously possible to add a damping volume to existing relay valves without much additional effort, all that is required being to exchange the housing cover.

According to an alternative embodiment of the invention, the damping volume is arranged in the relay valve piston. For this purpose, the relay valve piston has a cavity which extends around the relay valve piston axis and which is connected pneumatically to the control chamber.

Such an arrangement of the damping volume is advantageously possible even when it is not possible to implement an additional volume in the housing cover for reasons of space or the external dimensions of the conventional relay valve have to be retained for reasons of design.

Another preferred embodiment provides a passage between the damping volume and the control chamber, which passage is designed to connect the damping volume pneumatically to the control chamber. A connecting restrictor is furthermore arranged in the passage.

The passage advantageously allows easy insertion of a connecting restrictor of appropriate size. The connecting restrictor acts as a constriction in the passage. The connecting restrictor and the damping volume influence the effective rigidity of the air spring formed by the control chamber volume and, in this arrangement, are dimensioned in such a way that the oscillations of the relay valve piston are avoided.

According to another preferred embodiment of the invention, the relay valve has one or more control pressure lines, which is or are configured to feed a pressure medium subject to control pressure into the passage between the damping volume and the control chamber.

From the viewpoint of the damping volume, the control pressure line in this arrangement can be connected pneumatically to the passage ahead of the connecting restrictor or after the connecting restrictor. If there is more than one control pressure line, the control pressure lines can also be connected pneumatically to the passage on both sides of the connecting restrictor.

By means of the individual arrangement of the possible control pressure lines, it is advantageously possible to achieve different time behaviors in supplying the relay valve with pressure media in order to optimize damping.

In an alternative embodiment of the invention, an orifice plate is provided between the damping volume and the control chamber instead of a passage between the damping volume and the control chamber, wherein the orifice plate has an opening which acts as a connecting restrictor.

The use of an orifice plate has the advantage that the damping volume according to the invention can be employed even when it is not possible to use a passage, e.g. for reasons of space.

In another preferred embodiment of the invention, a control pressure line is routed directly into the control chamber in order to feed a pressure medium into the control chamber. The control chamber is thus advantageously filled first, before the pressure medium flows into the damping volume.

In another preferred embodiment of the invention, a control pressure line is routed directly into the damping volume in order to feed a pressure medium into the damping volume. The damping volume is thus advantageously filled first, before the pressure medium flows into the control chamber.

The abovementioned problem is furthermore solved by a valve device for a compressed air system, wherein the valve device has the relay valve according to the invention. In this case, the valve device is preferably an electronic air treatment device, an electronic parking brake device or, for example, an axle modulator or even some other device for a compressed air system.

The invention furthermore solves the problem underlying it by means of a vehicle, in particular a commercial vehicle, which has at least one relay valve according to the invention and/or at least one valve device according to the invention.

Further embodiments will become apparent from the illustrative embodiments, which are explained in greater detail by means of the drawings.

DETAILED DESCRIPTION OF THE DRAWINGS

Figure 1:
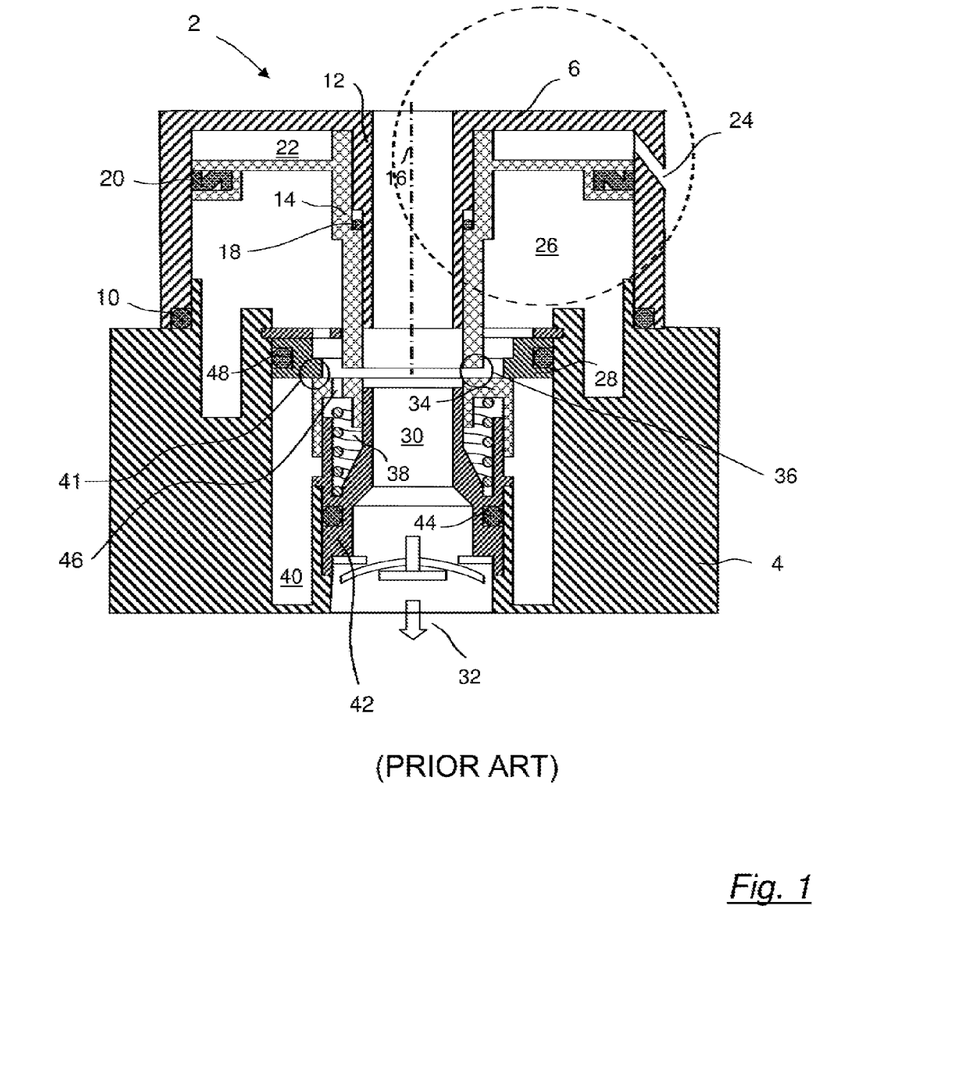
FIG. 1 shows a relay valve according to the prior art.

FIG. 1 shows a relay valve 2 according to the prior art, which boosts an air volume and which outputs and makes available compressed air in accordance with an applied control pressure. Here, the compressed air output in accordance with the control pressure can be made available in a short time in a relatively large volume.

The relay valve 2 has a housing, which comprises a first housing part 4 and a second housing part 6, in particular a housing cover. The housing parts 4 and 6 are connected firmly to one another and sealed with respect to one another by means of a sealing element 10.

Extending in the housing cover 6 is a relay valve piston guide 12, in which a relay valve piston 14 is arranged in such a way that the relay valve piston can be moved along a relay valve piston axis 16. The housing part 6 and the relay valve piston 14 are sealed with respect to one another by a sealing ring 18. A further sealing ring 20 designed as a Z ring seals the housing part 6 at the edge with respect to the moving relay valve piston 14.

A control chamber 22 arranged above the relay valve piston 14 is delimited by the relay valve piston 14 and the housing cover 6 or second housing part 6. A pressure medium subject to a control pressure can be fed into the control chamber 22 via a control pressure line 24.

FIG. 1 shows the relay valve 2 in a venting position, in which compressed air is passed into a venting chamber 30 from a working chamber 26, past an insert 28. The venting chamber 30 is connected to atmosphere via an outlet 32, allowing the compressed air to escape through the venting chamber 30.

Via a pressure medium outlet (not shown here), the working chamber 26 is connected pneumatically to a consuming unit, e.g. a brake cylinder. Thus, a connected consuming unit is vented when the pressure in the working chamber 26 is at least as high as the control pressure in the control chamber 22.

However, if the control pressure in the control chamber 22 is increased further, it exceeds the pressure in the working chamber 26, and the relay valve piston 14 assumes a neutral position. In this neutral position, a gap between the relay valve piston 14 and an air admission piston 34 is closed, with the result that an outlet valve 36 shuts off the working chamber 26 pneumatically from the venting chamber 30. To produce a better seal, the air admission piston 34 is preferably overmolded with a rubber. The air admission piston 34 is furthermore held in its position by a spring 38 when there is no force being exerted by the relay valve piston 14 on the air admission piston 34.

Increasing the control pressure in the control chamber 22 has the effect that the relay valve piston 14 moves into a venting position when the control pressure is at a level relative to the working pressure sufficient to move both the relay valve piston 14, counter to the frictional force thereof on the sealing rings 18 and 20, and the air admission piston 34, counter to the spring force of the spring 38.

The movement of the relay valve piston 14 gives rise, between the air admission piston 34 and the insert 28, to a gap which connects an air admission chamber 40 pneumatically to the working chamber 26 and thus opens an inlet valve 41. In this case, the air admission chamber 40 is supplied with a pressure medium, in particular compressed air, by a pressure medium source via a pressure medium inlet (not shown here). The spring 38 and the air admission piston 34 are held by a carrier element 42, wherein the carrier element 42 is inserted into the first housing part 4 and is sealed with respect to the housing by means of a sealing ring 44.

The space in which the spring 38 is arranged is connected to the working chamber 26 by an opening 46 in order to allow pressure compensation in the space containing the spring 38. In this case, the first housing part 4 is sealed pneumatically with respect to the insert 28, and the air admission chamber 40 is sealed pneumatically with respect to the working chamber 26, by means of a further sealing ring 48.

Figure 2:
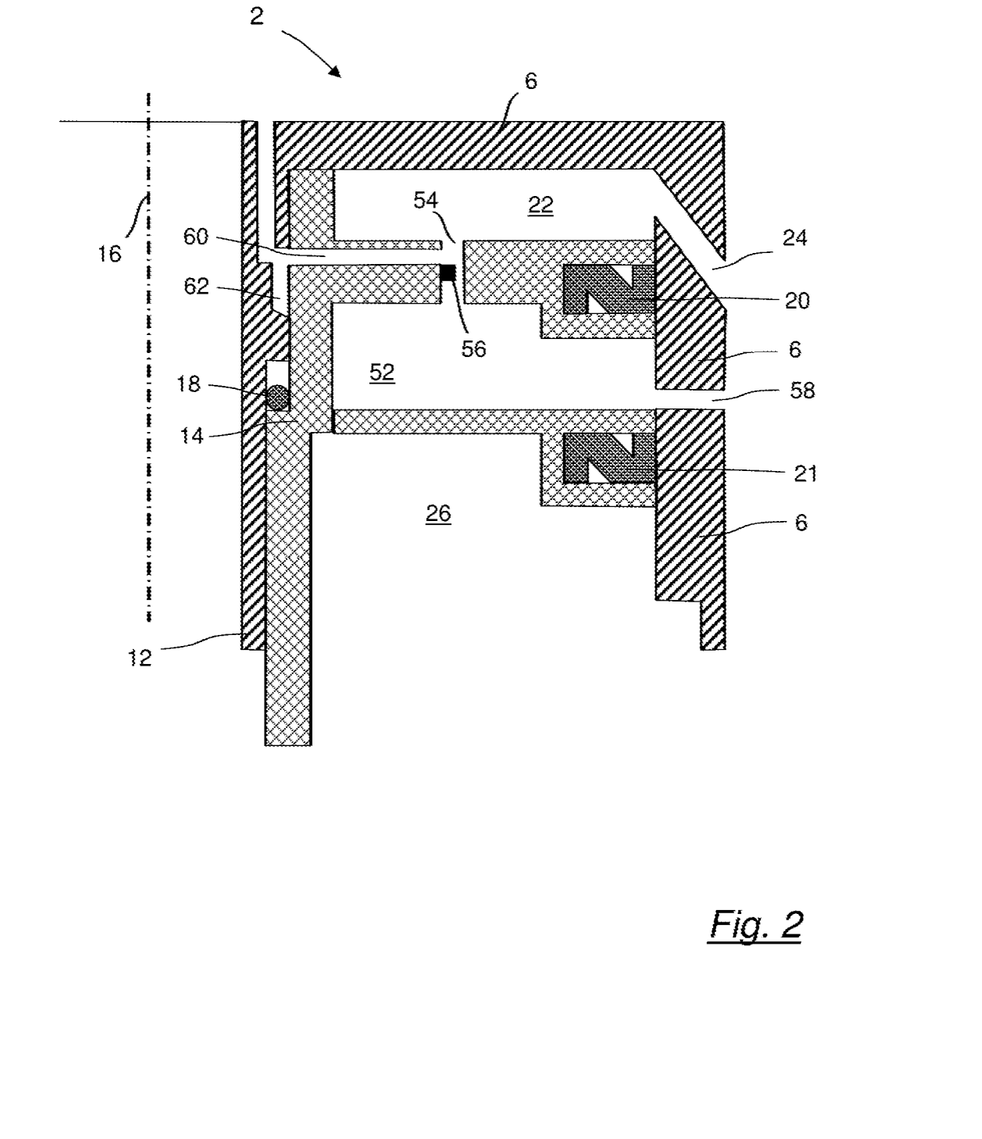
FIG. 2 shows a detail of a relay valve according to one illustrative embodiment of the invention having a damping volume in the interior of the relay valve piston.

FIG. 2 shows a detail of a relay valve 2 according to one illustrative embodiment of the invention. In FIG. 2 that region of the relay valve 2 which is encircled by a broken line in FIG. 1 is shown on an enlarged scale.

According to this illustrative embodiment, the relay valve piston 14 has a damping volume 52 in the interior of the relay valve piston 14. The damping volume 52 is connected pneumatically to the control chamber 22 by a passage 54. A connecting restrictor 56, which constricts the passage cross section, is preferably arranged in the passage 54. Given correct configuration of the damping volume 52 and of the size of the connecting restrictor 56, the oscillation behavior of the relay valve piston 14 is advantageously suppressed.

If the control chamber 22 is then supplied with compressed air via the control pressure line 24, said air first of all flows into the control chamber 22 and, from there, into the downstream damping volume 52 via the connecting restrictor 56.

A pilot control unit is usually arranged upstream of the relay valve 2, but this is not shown here. The pilot control unit of a pressure control circuit of an electronic braking system, for example, has electrically controllable valves interconnected pneumatically in a particular way, which are preferably embodied as solenoid valves. In addition to electrical connections for control of the solenoid valves, the pilot control unit generally has two pneumatic inlets and one outlet. Via a first inlet, the pilot control unit is supplied with an available redundant pressure and, via a second inlet, is supplied with a supply pressure of the pressure control circuit of the electronic braking system.

One possible embodiment of a pilot control unit of this kind is shown in DE 102 45 916 A1. The brake pressure modulator shown here preferably has a compact mechanical construction, in which the pilot control unit and the relay valve are arranged in a single valve block. In this case, the inlet of the relay valve is connected to the outlet of the pilot control unit, wherein the connections within the valve block are formed as bores or passages in the die cast housing.

However, the relay valve is not limited to a single inlet. On the contrary, a relay valve, e.g. in a braking system, can have up to three separate pressure medium connections in the control part, which can be connected by means of the solenoid valves of the pilot control unit to a control pressure, to a supply pressure or to atmosphere.

In addition to the first control pressure line 24, the relay valve 2 according to FIG. 2 has a second control pressure line 58, which is connected directly to the damping volume 52.

Another, third, possible control pressure line 60 is arranged in the relay valve piston 14 in such a way that the pressure medium can be passed via this control pressure line 60 into the passage 54 between the control chamber 22 and the damping volume 52.

The control pressure line 60 is routed upward in the housing part 6, wherein a lateral recess 62 in the housing part 6 allows a pressure medium to flow through the control pressure line 60 even when the relay valve piston 14 has been moved downward.

In the illustrative embodiment shown in FIG. 2, the third control pressure line 60 opens into the passage 54 above the connecting restrictor 56, as a result of which a large proportion of the pressure medium passes first of all into the control chamber 22, and the damping volume 52 is supplied after a time delay.

Similarly to the above embodiment, a fourth possible control pressure line is provided, although this is not shown in FIG. 2 since it is preferably situated in a different section plane (not shown here) in the relay valve piston 14.

Like the third possible control pressure line 60, the fourth possible control pressure line first of all passes through the housing part 6, in particular through the relay piston guide 12, via a recess into the relay valve piston 14 as far as the passage 54 connecting the control chamber 22 and the damping volume 52 to one another. The fourth control pressure line preferably opens into the passage 54 below the connecting restrictor 56, so that, in this arrangement, the pressure medium enters the damping volume 52 first and enters the control chamber 22 after a time delay.

The four possible control pressure lines described above illustrate merely possible pressure medium connections. However, they are not all necessarily present. On the contrary, each of the control pressure lines can be present individually or in any desired combination with one or two further lines.

Figure 6:
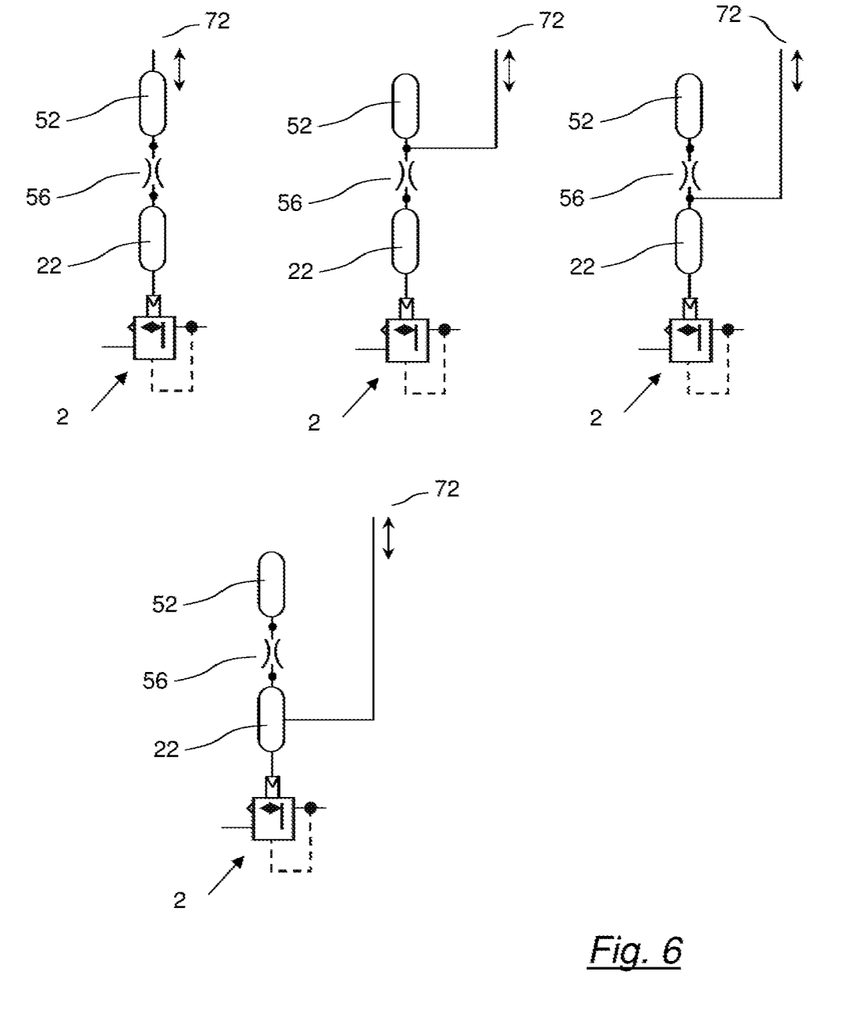
FIG. 6 shows a schematic diagram intended to illustrate the various possibilities for connection and arrangements of the damping volume in the case of a single pressure medium connection.
Figure 7:
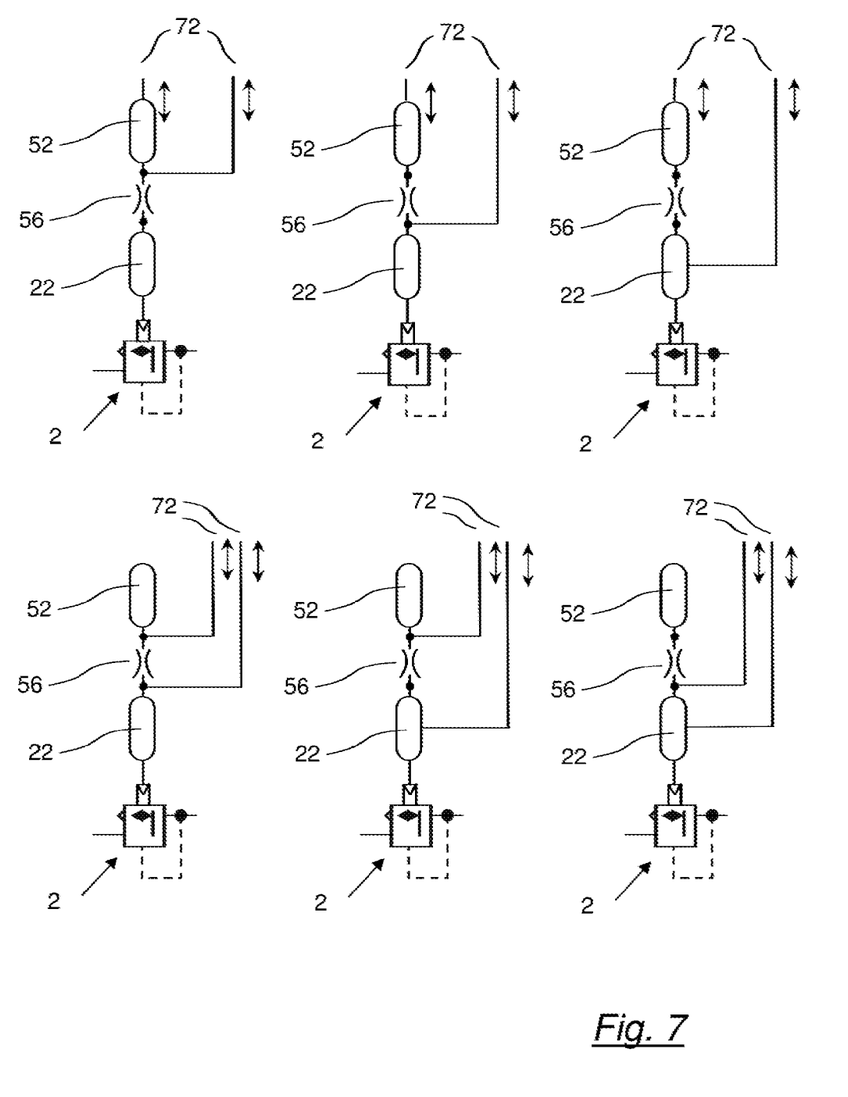
FIG. 7 shows a schematic diagram intended to illustrate the various possibilities for connection and arrangements of the damping volume in the case of two pressure medium connections.
Figure 8:
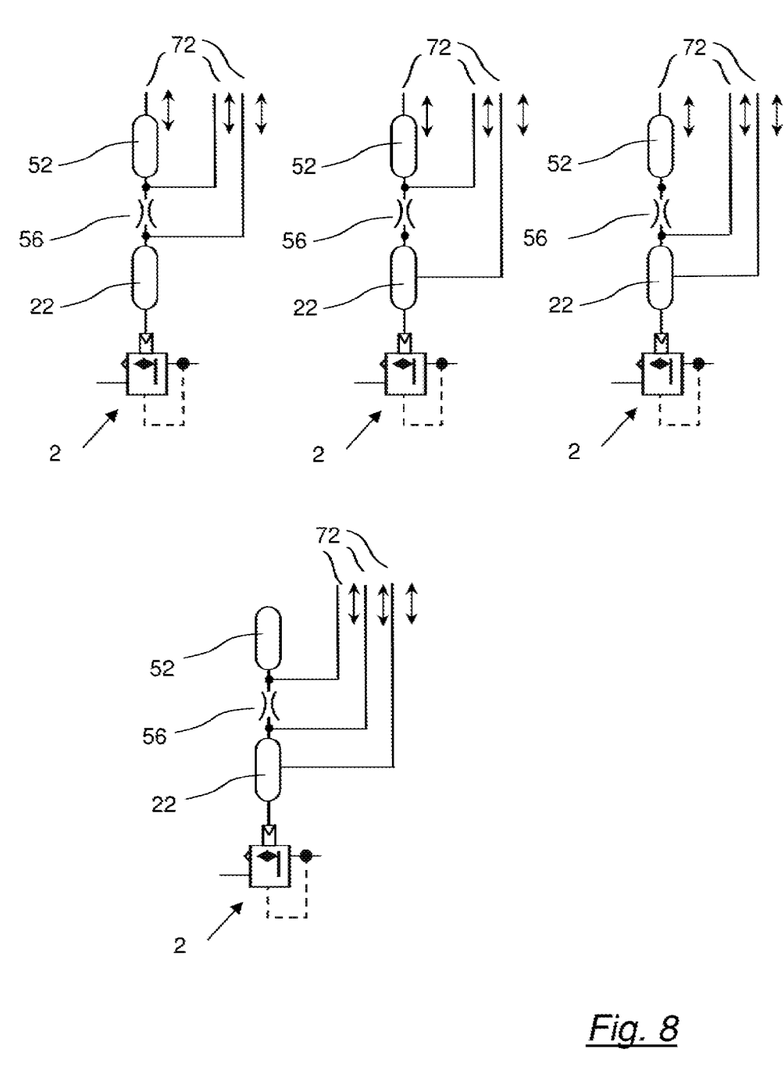
FIG. 8 shows a schematic diagram intended to illustrate the various possibilities for connection and arrangements of the damping volume in the case of three pressure medium connections.

FIG. 6 shows an overview of the possible connections of a control pressure line when using just one pressure medium connection, FIG. 7 shows an overview of the possible connections of the control pressure lines when using two pressure medium connections, and FIG. 8 shows an overview of the possible connections of the control pressure lines when using three pressure medium connections on the control part of the relay valve 2. The different connection possibilities have different timings in supplying the relay valve piston 14 with pressure medium and venting the relay valve 2. It is thereby advantageously possible to optimize the oscillation damping of the relay valve piston 14, taking into account the size of the damping volume 52 and of the connecting restrictor 56.

Figure 3:
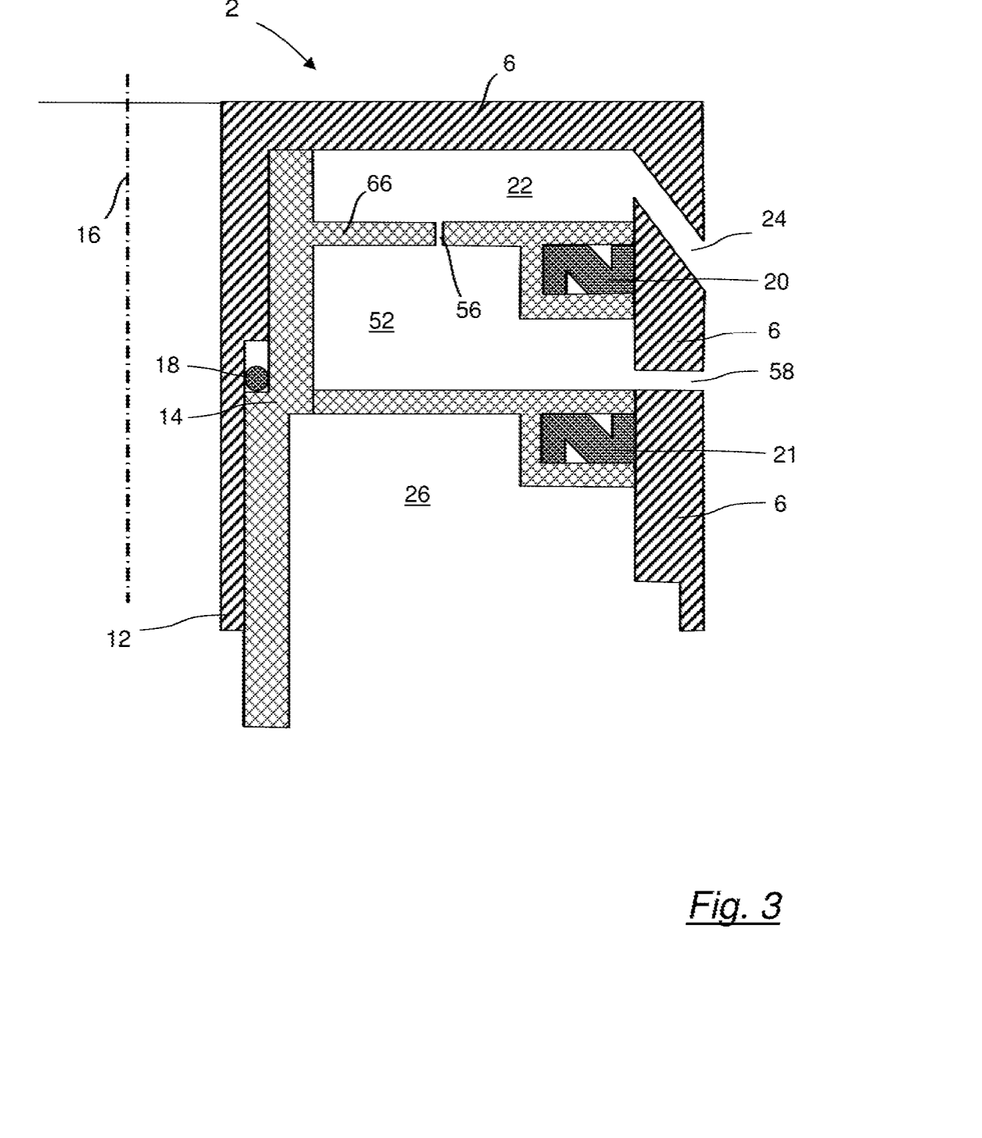
FIG. 3 shows a detail of a relay valve according to another illustrative embodiment of the invention, having a damping volume in the interior of the relay valve piston.

FIG. 3 shows a detail of a relay valve 2 according to an alternative embodiment of the invention. This likewise shows the region encircled by a broken line in FIG. 1.

In this embodiment, the damping volume 52 is likewise arranged within the relay valve piston 14 but is separated from the control chamber 22 by an orifice plate 66, wherein an opening arranged in the orifice plate 66 acts as a connecting restrictor 56.

This embodiment is suitable particularly when it is not possible to arrange a passage 54 in the relay valve piston 14 for space or design reasons.

Figure 4:
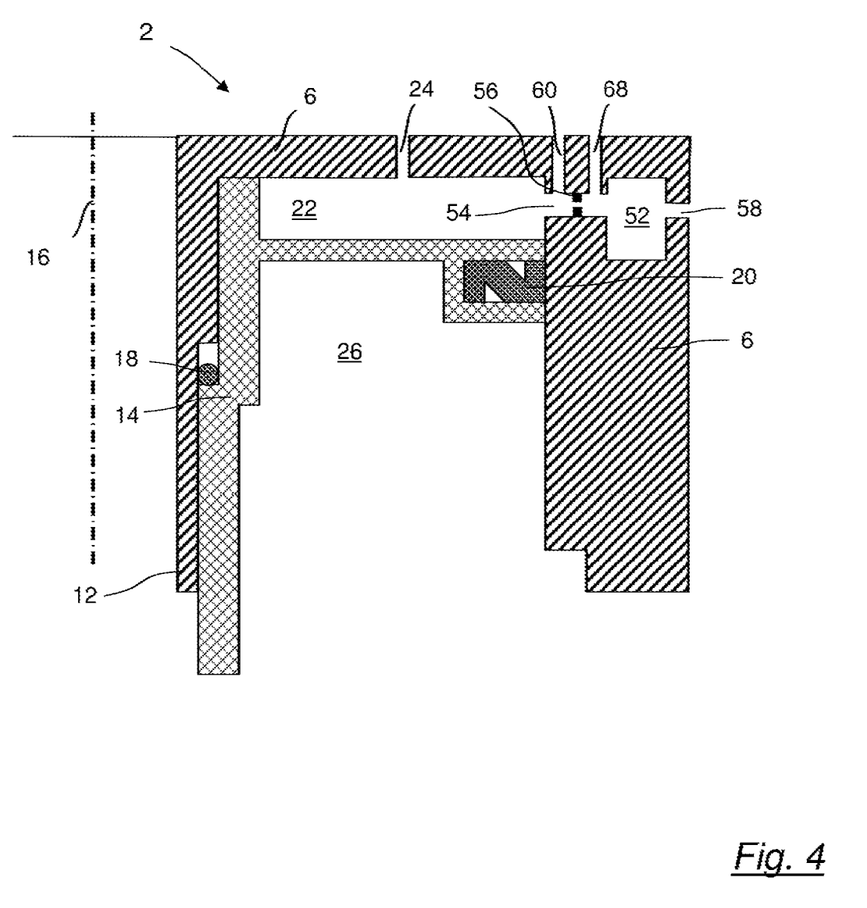
FIG. 4 shows a detail of a relay valve according to an alternative illustrative embodiment of the invention, having a damping volume in the housing cover.

FIG. 4 shows a detail of a relay valve 2 according to another alternative embodiment of the invention. Once again, that region of the relay valve 2 which is encircled by a broken line in FIG. 1 is shown on an enlarged scale.

In this alternative embodiment, the damping volume 52 is arranged in the housing, in particular in the second housing part 6 or housing cover.

A passage 54 for pneumatically connecting the damping volume 52 and the control chamber 22 is provided between the damping volume 52 and the control chamber 22. To constrict the passage 54, a connecting restrictor 56 is inserted in the passage 54. Given correct configuration of the damping volume 52 and of the size of the connecting restrictor 56, there is friction-independent self-damping of the system, whereby the oscillation behavior of the relay valve piston 14 is advantageously suppressed.

A first possible control pressure line 24 is routed directly into the control chamber 22 via the housing cover 6, and a second possible control pressure line 58 is routed directly into the damping volume 52 according to FIG. 4.

In addition, a third control pressure line 60 and a fourth control pressure line 68 are provided here, said lines leading into the passage 54 between the control chamber 22 and the damping volume 52 ahead of and after the connecting restrictor 56, respectively.

As already explained with reference to the illustrative embodiment according to FIG. 2, the abovementioned four control pressure lines 24, 58, 60 and 68 indicate merely possible pressure medium connections, which do not all have to be present. Each of the control pressure lines 24, 58, 60 or 68 can be present individually or in any desired combination with one or more further lines.

The possible connections, illustrated in FIG. 6 to FIG. 8, of the control pressure lines can also be applied to the embodiment of the invention according to FIG. 4.

Figure 5:
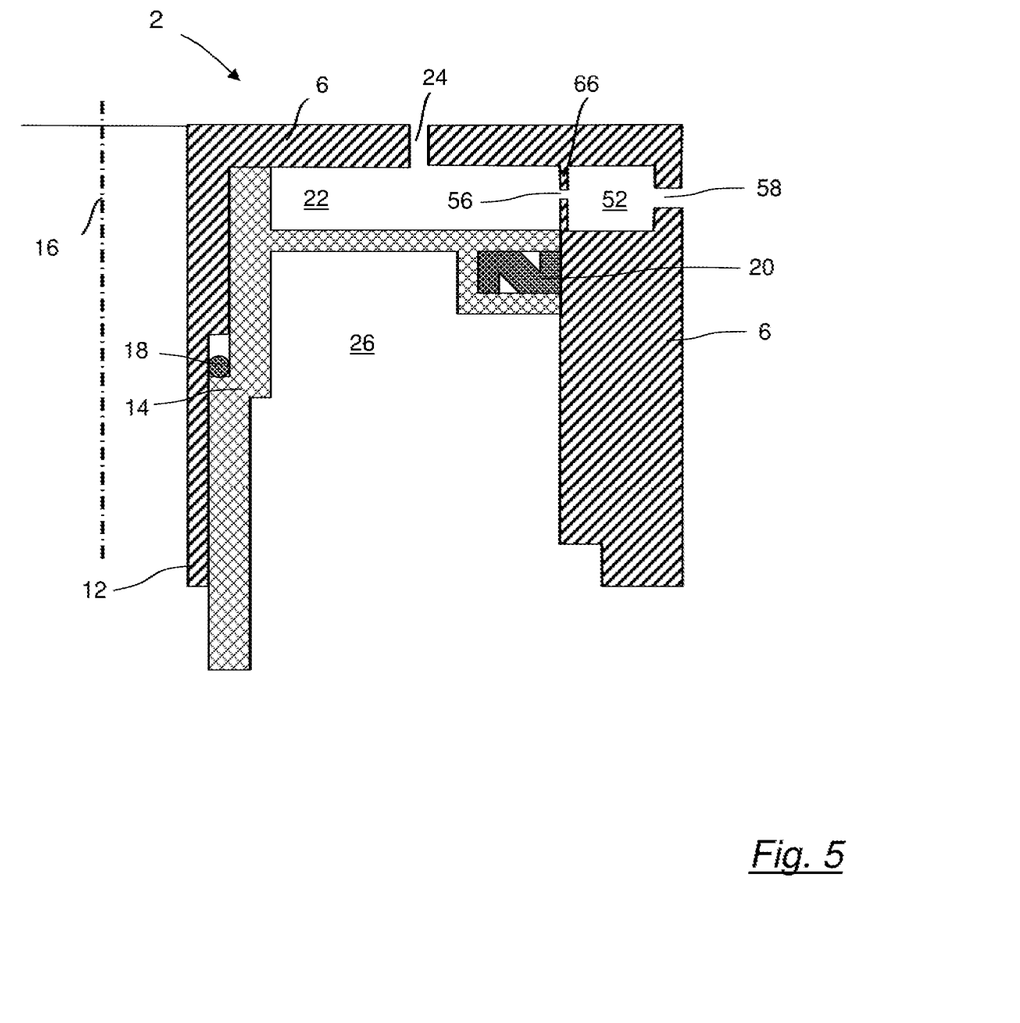
FIG. 5 shows a detail of a relay valve according to another alternative illustrative embodiment of the invention, having a damping volume in the housing cover.

FIG. 5 shows a detail of a relay valve 2 according to another alternative embodiment of the invention. Here, as shown in FIG. 4, the damping volume 52 is likewise arranged in the second housing part 6 or housing cover but is separated from the control chamber 22 by an orifice plate 66. Here, an opening arranged in the orifice plate 66 acts as a connecting restrictor 56.

This embodiment advantageously requires less space in the housing cover 6 since the passage 54 shown in FIG. 4 is eliminated.

FIG. 6 to FIG. 8 show various possibilities for arranging the damping volume 52 in the relay valve 2. FIG. 6 shows schematically possibilities for arrangement with one pressure medium connection 72, wherein the pressure medium connection 72 can be connected to the first control pressure line 24, to the second control pressure line 58, to the third control pressure line 60 or to the fourth control pressure line 68 in accordance with the explanations given in relation to FIG. 2 and FIG. 4.

FIG. 7 shows schematically possible arrangements with two pressure medium connections 72, wherein in each case one pressure medium connection 72 can be connected to the first control pressure line 24, to the second control pressure line 58, to the third control pressure line 60 or to the fourth control pressure line 68 in accordance with the explanations given in relation to FIG. 2 and FIG. 4.

FIG. 8 shows schematically possible arrangements with three pressure medium connections 72, wherein in each case one pressure medium connection 72 can be connected to the first control pressure line 24, to the second control pressure line 58, to the third control pressure line 60 or to the fourth control pressure line 68 in accordance with the explanations given in relation to FIG. 2 and FIG. 4.

The explanations in accordance with FIG. 2 to FIG. 5 given in relation to the possible control pressure lines 24, 58, 60 and 68 are only examples of connection. The invention is not restricted to the embodiments shown. By virtue of the design, the control pressure lines 24, 58, 60 and 68 can be arranged in any way in the relay valve 2 in order to reduce the vibration behavior of the relay valve piston 14.

The pressure medium connections 72 according to FIG. 6 to FIG. 8 can be connected via the respective control pressure line to a control pressure, a supply pressure or to atmosphere, for example, by means of the pilot control unit of the braking system. By means of the various connection possibilities, it is possible to vary the timing in supplying the relay valve 2 with a pressure medium and venting the relay valve 2, thus optimizing the damping of the relay valve piston 14 and advantageously suppressing the oscillation behavior of the relay valve piston 14.

All the features mentioned in the above description and in the claims can be combined both individually and in any desired combination with the features of the independent claims. Therefore, the disclosure of the invention is not restricted to the combinations of features described and claimed. On the contrary, all combinations of features that are worthwhile within the scope of the invention should be regarded as disclosed.

The invention claimed is:

1. A relay valve for a compressed air system, comprising:
   a housing, which has a pressure medium inlet configured to be connected to a pressure medium source, at least one pressure medium outlet configured to be connected to a consuming unit, at least one control inlet, and at least one vent (32) leading to atmosphere,
   a relay valve piston (14), which is arranged in the housing in such a way that the relay valve piston is movable along a relay valve piston axis (16), the relay valve piston separating a control chamber (22) and a working chamber (26) from each other in the housing, the control chamber (22) being connectable to the control inlet, the working chamber (26) being connectable to the pressure medium source, the pressure medium outlet, and the vent,
   a damping volume (52) pneumatically connected to the control chamber (22),
   a passage (54) between the damping volume (52) and the control chamber (22), which passage is designed to connect the damping volume (52) pneumatically to the control chamber (22), and
   a connecting restrictor (56) arranged in the passage (54).

2. The relay valve as claimed in claim 1, wherein the damping volume (52) is integrated into the housing.

3. The relay valve as claimed in claim 1, wherein the damping volume (52) is arranged in the relay valve piston (14).

4. The relay valve as claimed in claim 1,
further comprising at least one control pressure lines (24; 58; 60; 68), which is configured to feed a pressure medium subject to control pressure into the passage (54) between the damping volume (52) and the control chamber (22).

5. The relay valve as claimed in claim 1,
further comprising an orifice plate (66) between the damping volume (52) and the control chamber (22), wherein the orifice plate (66) has an opening which acts as a connecting restrictor (56).

6. The relay valve as claimed in claim 1,
further comprising a control pressure line (24), which leads directly into the control chamber (22) and is configured to feed a pressure medium directly into the control chamber (22).

7. The relay valve as claimed in claim 1,
further comprising a control pressure line (58), which leads directly into the damping volume (52) and is configured to feed a pressure medium directly into the damping volume (52).

8. A valve arrangement for a compressed air system, comprising a relay valve (2) having
a housing, which has a pressure medium inlet configured to be connected to a pressure medium source, at least one pressure medium outlet configured to be connected to a consuming unit, at least one control inlet, and at least one vent (32) leading to atmosphere,
a relay valve piston (14), which is arranged in the housing in such a way that the relay valve piston is movable along a relay valve piston axis (16), the relay valve piston separating a control chamber (22) and a working chamber (26) from each other in the housing, the control chamber (22) being connectable to the control inlet, the working chamber (26) being connectable to the pressure medium source, the pressure medium outlet, and the vent,
a damping volume (52) pneumatically connected to the control chamber (22),
a passage (54) between the damping volume (52) and the control chamber (22), which passage is designed to connect the damping volume (52) pneumatically to the control chamber (22), and
a connecting restrictor (56) arranged in the passage (54).

9. A vehicle comprising at least one relay valve (2) having
a housing, which has a pressure medium inlet configured to that can be connected to a pressure medium source, at least one pressure medium outlet configured to be connected to a consuming unit, at least one control inlet, and at least one vent (32) leading to atmosphere,
a relay valve piston (14), which is arranged in the housing in such a way that the relay valve piston is movable along a relay valve piston axis (16), the relay valve piston separating a control chamber (22) and a working chamber (26) from each other in the housing, the control chamber (22) being connectable to the control inlet, the working chamber (26) being connectable to the pressure medium source, the pressure medium outlet, and the vent,
a damping volume (52) pneumatically connected to the control chamber (22),
a passage (54) between the damping volume (52) and the control chamber (22), which passage is designed to connect the damping volume (52) pneumatically to the control chamber (22), and
a connecting restrictor (56) arranged in the passage (54).

* * * * *